United States Patent
Gonzalez

(10) Patent No.: US 10,691,374 B2
(45) Date of Patent: Jun. 23, 2020

(54) REPEATABLE STREAM ACCESS BY MULTIPLE COMPONENTS

(71) Applicant: salesforce.com, inc., San Francisco, CA (US)

(72) Inventor: Mariano Gonzalez, Ciudad Autonoma de Buenos Aires (AR)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/044,033

(22) Filed: Jul. 24, 2018

(65) Prior Publication Data
US 2020/0034071 A1    Jan. 30, 2020

(51) Int. Cl.
*G06F 3/06*    (2006.01)
*G06F 16/2455*    (2019.01)

(52) U.S. Cl.
CPC .......... *G06F 3/0656* (2013.01); *G06F 3/0629* (2013.01); *G06F 16/24568* (2019.01); *G06F 3/0659* (2013.01)

(58) Field of Classification Search
CPC .......... G06F 3/0656; G06F 16/24568
See application file for complete search history.

(56) References Cited

U.S. PATENT DOCUMENTS

| | | | | |
|---|---|---|---|---|
| 7,149,807 | B1* | 12/2006 | Kontothanassis | H04L 67/1008 709/230 |
| 7,904,618 | B2* | 3/2011 | Inoue | G06F 5/10 710/54 |
| 9,223,638 | B2* | 12/2015 | Hudzia | G06F 9/52 |
| 10,338,958 | B1* | 7/2019 | Kamboj | G06F 9/4881 |
| 2004/0128342 | A1* | 7/2004 | Maes | H04L 29/06027 709/200 |
| 2019/0104081 | A1* | 4/2019 | Kairali | H04L 47/72 |

* cited by examiner

*Primary Examiner* — Farley Abad
(74) *Attorney, Agent, or Firm* — Sterne, Kessler, Goldstein & Fox P.L.L.C.

(57) ABSTRACT

Disclosed herein are system, method, and computer program product embodiments for providing repeatable stream access by multiple consumers. A repeatable stream object is provided, which provides an in-memory buffer and disk storage for handling of a data stream, as well as independent, repeatable, and parallel access to the data stream by multiple consumers. Using the repeatable stream object, consuming of the stream by a first consumer causes the stream to also be placed into the in-memory buffer for later reuse, and does not impact the ability of a second consumer to also consume the stream.

20 Claims, 8 Drawing Sheets

REPEATABLE STREAM ACCESS BY MULTIPLE COMPONENTS

BACKGROUND

Data being read by an application may arrive in the form of a data stream. In a data stream, the application accesses and processes data from the data stream while the data stream is actively being received. The process of configuring and accessing the stream is often not intuitive, and requires that the application track several pieces of information about the stream. Worse, if the stream needs to be accessed by more than one consumer of the stream data, there are no generally suitable solutions short of simply loading the stream into a buffer first.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing repeatable stream access by multiple components.

Figure 1:
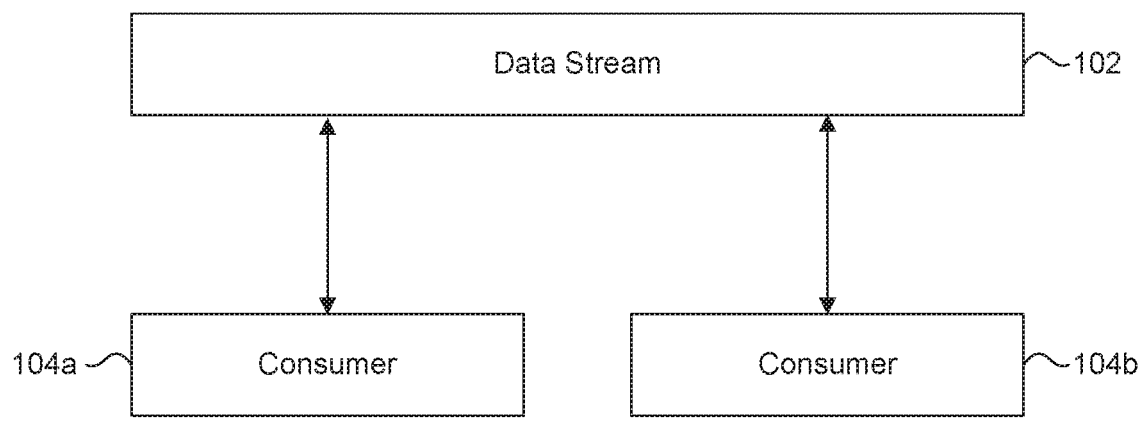
FIG. 1 is an exemplary stream interface, in accordance with an embodiment.

FIG. 1 is an exemplary stream interface 100, in accordance with an embodiment. In stream interface 100, a data stream 102 is accessed by consumers, such as consumer 104a and consumer 104b. In the example of stream interface 100, consumers 104a and 104b each directly interface with data stream 102, and can obtain data from data stream 102.

As long as a single consumer 104 is reading data stream 102 at a time, that consumer will receive the entire stream from the point it began reading the stream until it stops. The consumer, such as consumer 104a, will receive some data from data stream 102, consume it, and then obtain the next data from data stream 102 to consume, and so forth.

Consuming the data from a stream renders that data inaccessible to any other consumer. The data is removed from the data stream 102, either by request of consumer 104a (e.g., by pulling the data out of a queue), or shipped directly to the consumer 104a through a connection between the consumer 104a and data stream 102. Either way, if consumer 104b needs access to the data stream 102 at the same time as consumer 104a, consumer 104b will interfere with consumer 104a's access to data stream 102.

One way to understand the problem posed by two consumers 104a and 104b accessing the same data stream 102 is through a quote credited to Heraclitus of Ephesus, "no man ever steps in the same river twice." Stepping in the river changes the river. Similar to this thought, consuming a data stream 102 can be thought of as drinking a pint of beer. When a sip of the beer is taken, that sip cannot be taken again—it is lost forever. If one person drinks the pint of beer, a second person will not be able to drink that same beer. Even if the pint glass is refilled for the benefit of the second person, it is not the same beer. And if the first person completely empties the pint glass, there is no beer left at all for the second person.

This analogy accurately reflects the access problem faces by consumers 104a and 104b. As each consumer accesses the data from data stream 102 (sipping from the beer, per the analogy), any data accessed by consumer 104a will never again be available for consumption by consumer 104b.

Streams operate in this manner because they allow a process reading the stream, such as an application, to avoid the need to load a potentially large chunk of data into memory completely. A potentially large stream, possibly gigabytes or terabytes of data in size, can be accessed in incremental chunks of smaller sizes. And while the application is processing one chunk of data from the stream, it can be receiving the next chunk.

Figure 2:
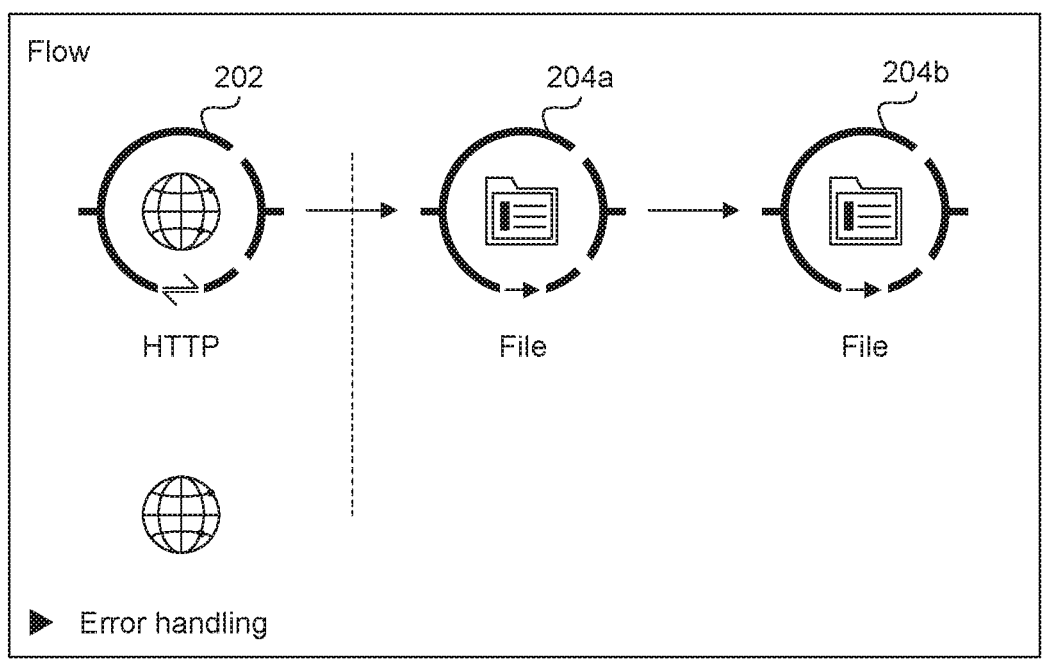
FIG. 2 is an application flow illustrating consumption of a stream in accordance with an embodiment.

FIG. 2 is an application flow 200 illustrating consumption of a stream in accordance with an embodiment. In application flow 200, content from a data stream 202 is received by two file write routines 204a and 204b. By way of non-limiting example, this data stream 202 could be received over HTTP, such as a POST with JSON, but a person skilled in the relevant art would appreciate that any stream would operate in a similar manner here.

In application flow 200, file write routine 204a captures the HTTP data from data stream 202 and writes it to a file. However, file write routine 204b no longer has data available from data stream 202 to consume. In accordance with an embodiment, while file write routine 204b creates a file for storage, the file is empty because there is no data in data stream 202 remaining for consumption by file write routine 204b.

Figure 3:
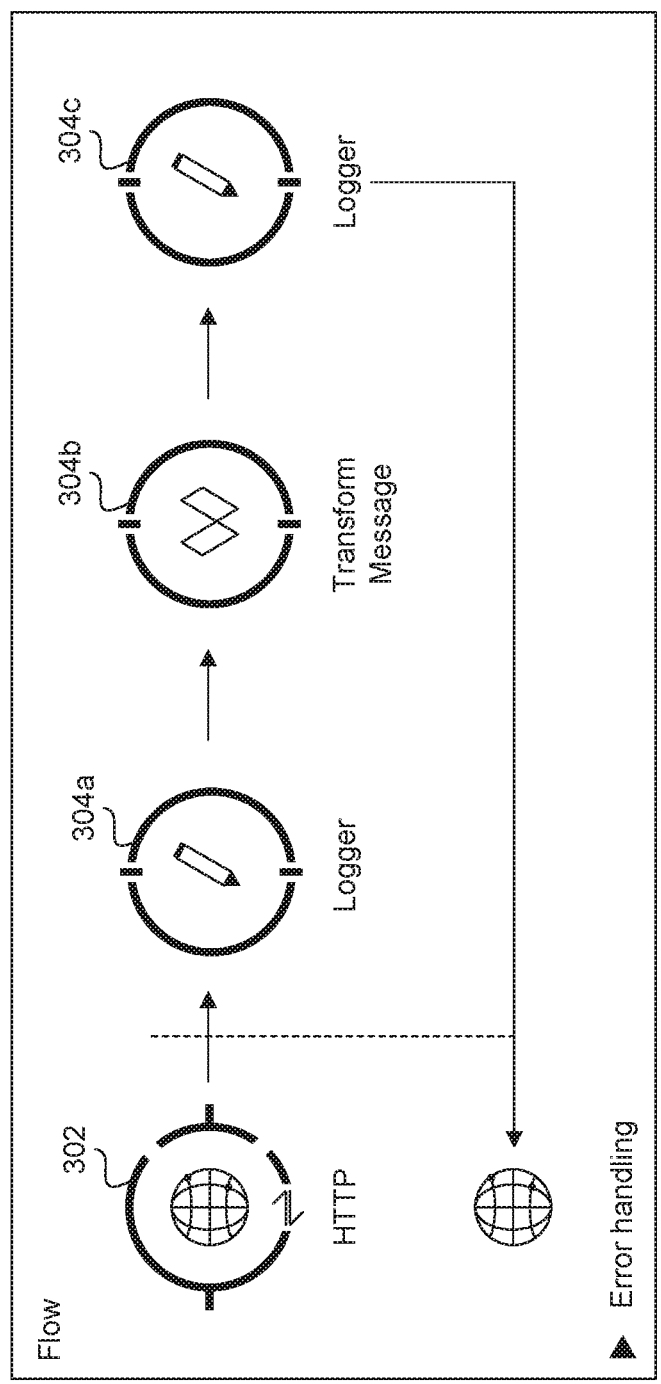
FIG. 3 is an application flow illustrating consumption of a stream in accordance with an additional embodiment.

FIG. 3 is an application flow 300 illustrating consumption of a stream in accordance with an additional embodiment. In application flow 300, content from data stream 302 is received by a logger 304a, and then consumed by transform message 304b, and finally logger 304c. In accordance with an embodiment, logger 304a consumes data stream 302, but the result of the logging operation performed by logger 304a is that data stream 302 is loaded into memory. When transform message processor 304b attempts to read data stream 302, it finds the contents loaded into memory from the logging process of logger 304a. Transform message processor 304b is then able to properly consume the data stream 302.

But once again, when the time comes for logger 304c to consume data stream 302, the stream is empty, because it has been consumed by transform message processor 304b.

Figure 4:
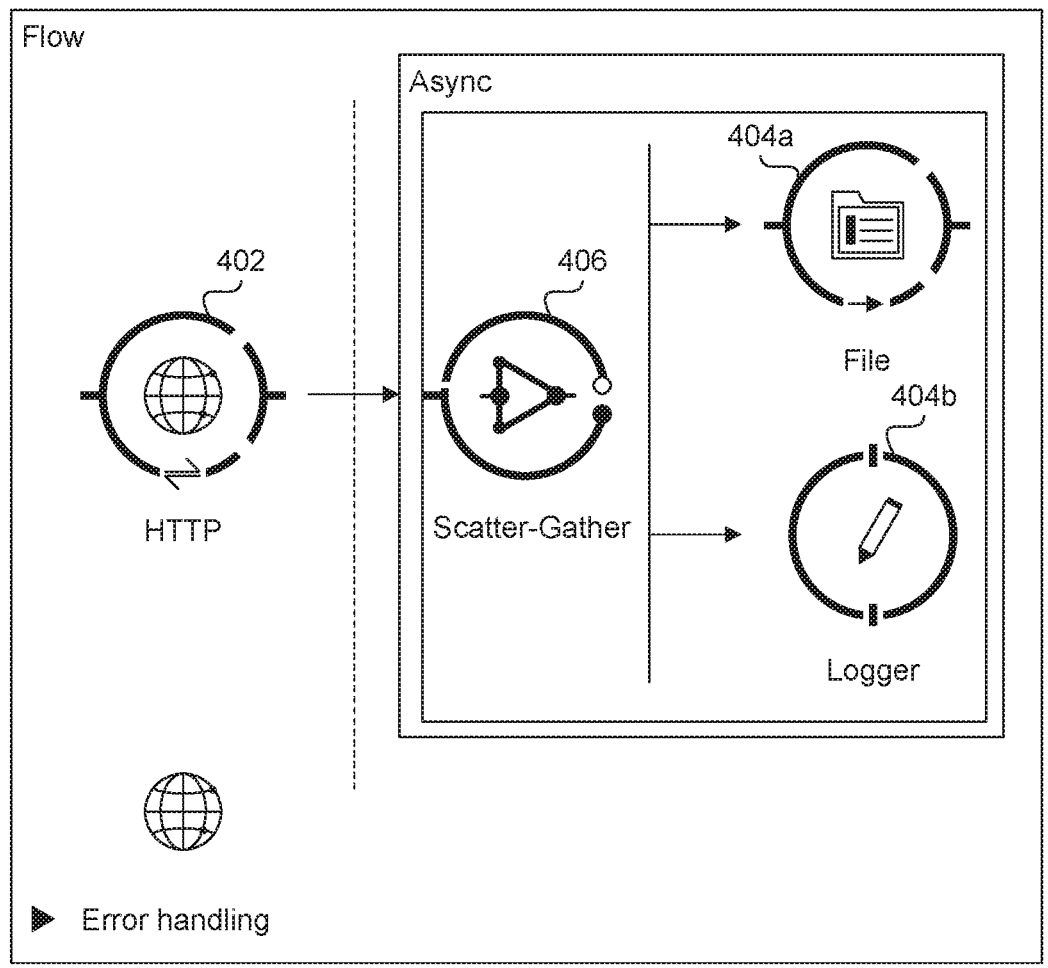
FIG. 4 is an application flow illustrating consumption of a stream in accordance with a further embodiment.

FIG. 4 is an application flow 400 illustrating consumption of a stream in accordance with a further embodiment. In application flow 400, content from data stream 402 is consumed by both file write routine 404a and logger 404b. A scatter-gather router 406 can be placed between the data stream 402 and consumers 404a and 404b, with the intention of splitting the data stream to simultaneously log and write the payload to a file. But it is not possible for two consumers to alternate direct access to a stream, as they will never obtain the entire stream.

Returning to the beer analogy, if two people take alternate sips of beer from the same glass, they will never each take the same sips of beer as the other, consuming only some portion of the beer. In application flow 400, scatter-gather router 406 will access data stream 402 to obtain a chunk of data, and send that chunk of data to either consumer 404a or consumer 404b. But as soon as the scatter-gather router 406 reads the chunk from data stream 402, it has consumed the chunk. For any given chunk of data from data stream 402, it will be sent to only one of consumer 404a or consumer 404b.

The consumption issues of application flow 200 of FIG. 2, application flow 300 of FIG. 3, and application flow 400 of FIG. 4 can be resolved by forcing the application to load the contents of the stream into memory, from which any additional consumers can have ongoing access to the stream. This is what takes place in application flow 300 between logger 304a, which loads data stream 302 into memory, and transform message processor 304b, which is able to consume the data that has been loaded into memory. While this approach will allow as many consumers as possible access to the stream data, sequentially or in parallel, an application must force certain constraints to ensure successful operation of this approach.

Figure 5:
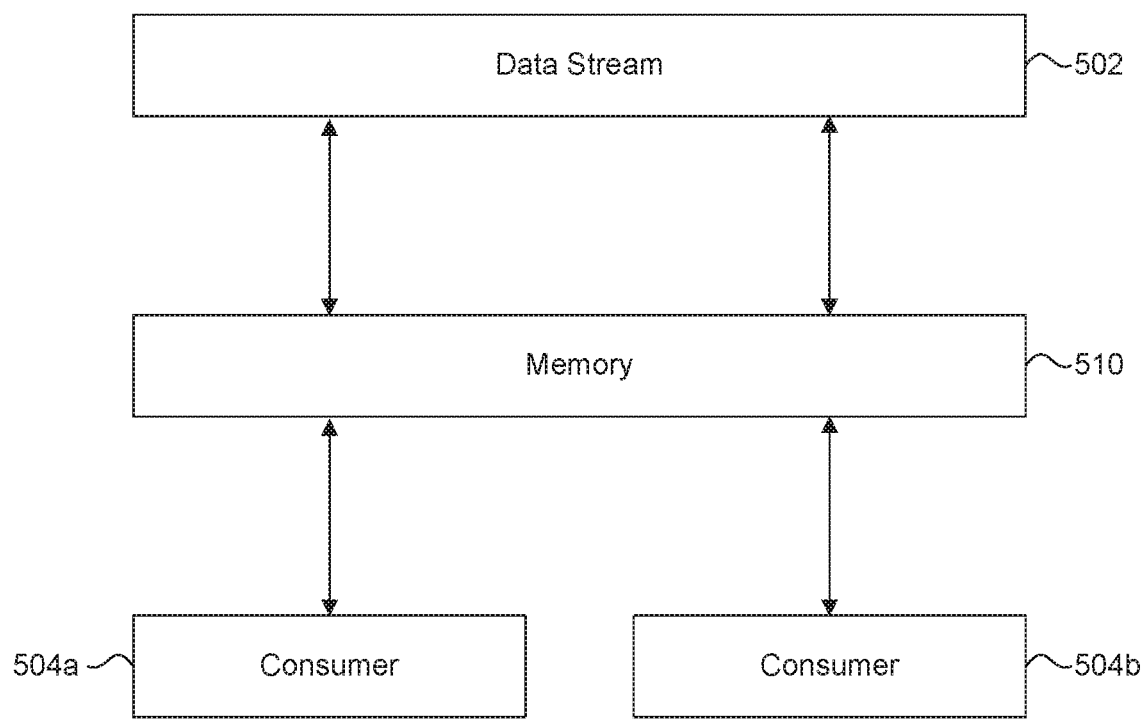
FIG. 5 is an exemplary stream interface in accordance with an embodiment.

Turning to FIG. 5, an exemplary stream interface 500 in accordance with an embodiment is depicted. Data stream 502 provides data for consumers 504a and 504b to access. However, stream interface 500 adds a memory 510 between the data stream 502 and consumers 504. As data stream 502 arrives, it is loaded into memory 510 and made accessible from there to consumer 504a and consumer 504b (and as many additional consumers as may exist).

By loading the contents of data stream 502 into memory 510, consumer 504a and consumer 504b may each access the entire data stream 502 directly from memory 510, in accordance with an embodiment. This access may occur serially or even in parallel. The stream access behavior of consumer 504a does not impact the ability of consumer 504b to access the same data. Consumer 504a could consume all of the contents of data stream 502 from memory 510, and then some time later consumer 504b could consume all of the same contents of data stream 502 from memory 510.

This approach can work, but faces a memory constraint. The size of memory 510 must be sufficiently large to store the entirety of data stream 502. If memory 510 is too small for this, then some of the data from data stream 502 will be lost, and a later-accessing consumer may not be able to obtain the entire data stream 502 from memory 510. Moreover, even if there is sufficient memory 510 to hold the entire data stream 502, the duration of such memory allocation may need to be for the execution life span of the application. A large stream could cause significant slowdowns and other resource problems for an application. Additionally, consumers 504 must access chunks of data stream 502 through memory 510—data must be stored into a buffer in memory 510 before it is accessible to consumers 504.

Figure 6:
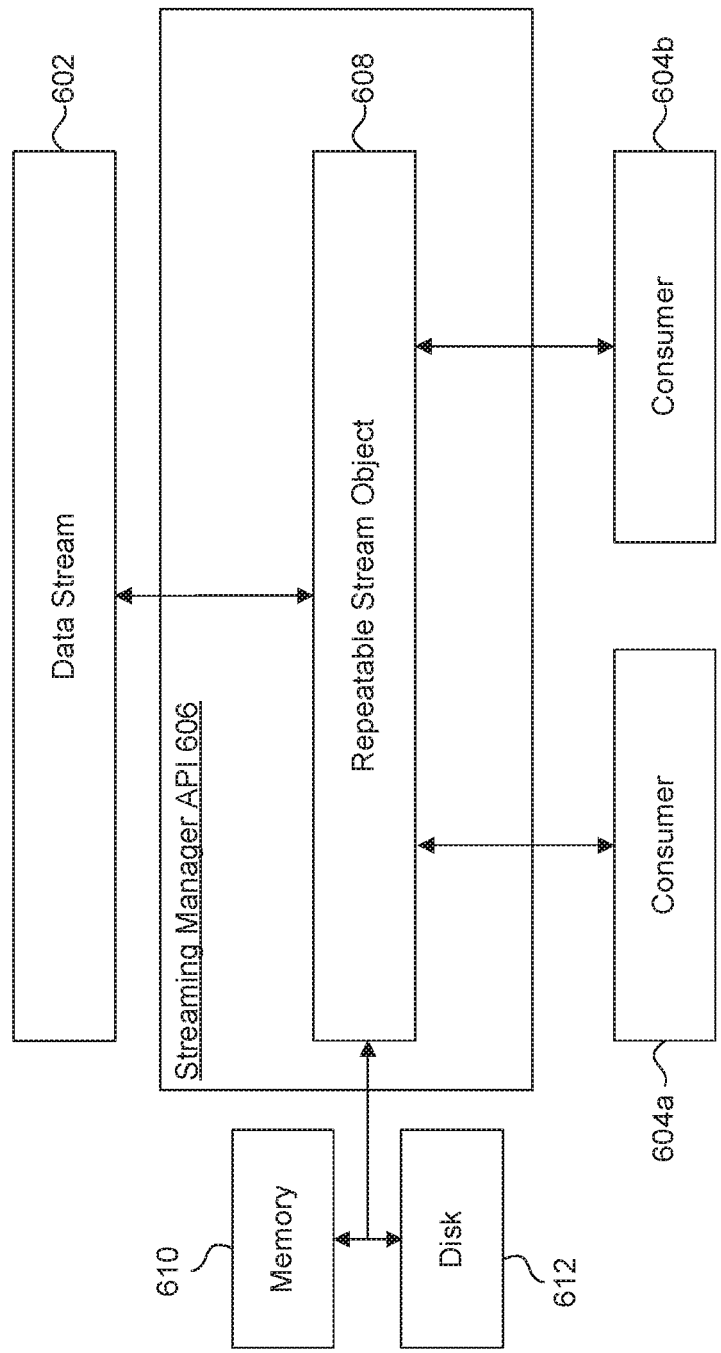
FIG. 6 is an exemplary stream interface using a repeatable stream, in accordance with an embodiment.

FIG. 6 is an exemplary stream interface 600 using a repeatable stream, in accordance with an embodiment. Data stream 602 is available for consumption by consumer 604a and consumer 604b (and any number of additional consumers). Stream interface 600, however, introduces a repeatable stream object 608 through which consumers 604 access data stream 602. This repeatable stream object 608 is provided, in accordance with an embodiment, through a streaming manager API 606. And the repeatable stream object 608 has access to a memory 610 and a disk 612 for storage, in accordance with a further embodiment.

Using a repeatable stream object 608, it is possible to read data stream 602 more than once, and for consumers 604a and 604b to have concurrent access to data stream 602. As a consumer 604 consumes data stream 602, the content of data stream 602 is saved to a temporary buffer, such as in memory 610, by repeatable stream object 608. Each consumer 604 is able to receive the full stream 602, regardless of how much of the stream was already consumed by any prior component. No special configuration is required by the application or an individual consumer 604 in order to do this, and works well for streams of any size.

Repeatable stream object 608 tracks a position in the stream for consumer 604a independently of a position in the stream for consumer 604b, in accordance with an embodiment. As a result, consumer 604a may be reading data from data stream 602 in near real-time, while consumer 604b may be reading data from data stream 602 at an earlier point.

Unlike the memory-bound approach of stream interface 500 of FIG. 5, repeatable stream object 608 need not know a size of the data stream 602 in advance to ensure sufficient memory capacity for storage. This is because, in accordance with an embodiment, repeatable stream object 608 initially uses an in-memory buffer 610 of a defined size. If the size of in-memory buffer 610 is exceeded because data stream 602 is larger than the memory 610, repeatable stream object 608 creates a temporary file on disk 612 to store the contents without overflowing memory 610.

In accordance with an embodiment, repeatable stream object 608 sets a default size for the in-memory buffer (e.g., 512 kB) so that an application developer need not pick a size. However, if the size of the stream is known, repeatable stream object 608 permits a developer to configure a buffer of a matching size to avoid unnecessary writes to disk 612 where the entire data stream 602 could reasonably fit within memory 610. For example, if a developer knows that a file being read is always going to be around 1 MB in size, a 1 MB buffer can be configured ahead of time in the following exemplary manner:

```
<file:read path="bigFile.json">
    <repeatable-file-store-stream
        inMemorySize="1"
        bufferUnit="MB"/>
</file:read>
```

Or, if the developer knows that a file being read is always no bigger than 10 kB, it is possible to save memory, with a repeatable stream declared in the following exemplary manner:

```
<file:read path="smallFile.json">
    <repeatable-file-store-stream
        inMemorySize="10"
        bufferUnit="KB"/>
</file:read>
```

The foregoing exemplary approaches allow fine-tuning of the in-memory buffer in order to save memory 610 and reduce unnecessary writes to disk 612. However, a person of ordinary skill in the art would appreciate that such fine-tuning is optional, and default options for repeatable stream object 608 allow out-of-the-box operation regardless of whether the size of a stream is known or not.

Figure 7:
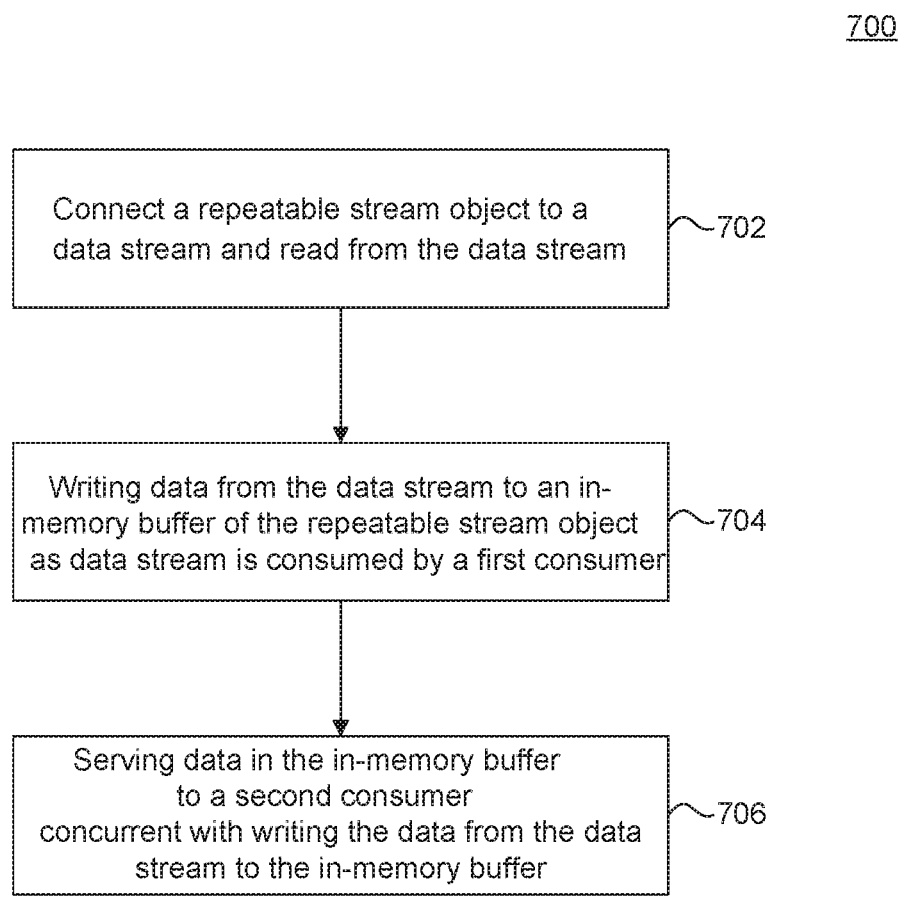
FIG. 7 is a flowchart illustrating the process by which consumers access a repeatable data stream, in accordance with an embodiment.

FIG. 7 is a flowchart 700 illustrating e process by which consumers access a repeatable data stream, in accordance with an embodiment. At step 702, a repeatable stream object, such as repeatable stream object 608 of FIG. 6, is connected to a data stream, such as data stream 602 of FIG. 6 and reads chunks of data from the data stream. At step 704, as a first consumer, such as consumer 604a of FIG. 6, accesses the stream, the repeatable stream object writes data from the data stream to an in-memory buffer of the repeatable stream object, such as a buffer in memory 610 of repeatable stream object 608 of FIG. 6. This allows the stream to be accessible to a second consumer. And at step 706, data from the in-memory buffer is served to a second consumer, concurrent with writing the data from the data stream to the in-memory buffer, in accordance with an embodiment.

One advantage of this implementation is that data from data stream 602 need not be entirely loaded into memory 610 (or disk 612) before it can be accessed by a consumer 604. The approach described herein, in accordance with an embodiment, is true streaming with near real-time performance. Data from data stream 602 is stored by repeatable stream object 608 in the in-memory buffer of memory 610 as it is accessed by a first consumer 604a, allowing for near real-time consumption of the stream by first consumer 604a and subsequent access from the buffer of memory 610 by a second consumer 604b.

In particular, the workflow of a typical solution to repeatable streaming is to (1) connect to a data stream, (2) obtain a chunk of data from the data stream, (3) place that chunk into a buffer, (4) consume (by a consumer) the chunk from the buffer. The workflow repeats steps (2)-(4) for additional chunks. This approach prevents any consumer from operating at near real-time, as chunks of data from the data stream must first be placed in the buffer.

In contrast, as described above in accordance with a non-limiting embodiment, a workflow corresponding to the operation of repeatable stream object 608 (1) connects to a data stream 602, (2) obtains chunks of data from the data stream 602, and (3) places those chunks of data into a buffer in memory 610 (and/or in disk 612 if needed) as (or while) they are consumed (directly by a first consumer, e.g., first consumer 604a, in near real-time). Additional consumers second consumer 604b) may then retrieve data from data stream 602 from repeatable stream object 608 via the buffer in memory 610 or disk 612. The workflow repeats steps (2)-(3) for additional chunks.

In accordance with an embodiment, repeatable stream object 608 can be placed into a file store repeatable stream mode or an in-memory repeatable stream mode. In the file store repeatable stream mode, which in an embodiment is the default configuration for repeatable stream object 608, the repeatable stream object uses the in-memory buffer of memory 610 as needed, but can overflow storage onto one or more files on disk 612, as described above.

However, in the in-memory repeatable stream mode, repeatable stream object 608 can be forced to only use memory 610 for storage. In this mode, repeatable stream object 608 will not use disk 612 for storage, and if data stream 602 exceeds the in-memory buffer held in memory 610, the repeatable stream access will fail. In accordance with an embodiment, an in-memory repeatable stream can be declared to have an initial buffer size and a maximum buffer size, with a buffer size increment value defining an increment by which the buffer will grow, as needed, from the initial to the maximum size. An example definition of a repeatable in-memory stream accessing a large file ("bigFile.json") could be written in the following manner:

```
<file:read path="bigFile.json">
    <repeatable-in-memory-stream
        initialBufferSize="512"
        bufferSizeIncrement="256"
        maxBufferSize="2048"
        bufferUnit="KB"/>
</file:read>
```

In an embodiment, as described above, repeatable stream object 608 is configured in a file store repeatable stream mode by default. In some instances, it may be desirable to disable repeatable streams entirely. This could be because, in an exemplary implementation, all streams are managed via repeatable stream objects 608 provided by streaming manager API 606, but a particular stream will only ever be accessed by a single consumer and the application developer wishes to avoid the slight performance overhead needed for repeatable streams. Therefore, in accordance with an embodiment, the repeatable stream object may be configured without repeatable streaming, in which case it functions exactly like a traditional stream as previously described (and with all of the same issues if accessed by multiple consumers). An example definition of a non-repeatable stream accessing a file could be written in the following manner:

```
<file:read path="bigFile.json">
    <non-repeatable-stream />
</file:read>
```

In accordance with an embodiment, repeatable stream object 608 is provided through streaming manager API 606. This API allows an application developer to readily connect to streams, such as data stream 602, by defining repeatable stream objects that can be instantiated by an application using streaming manager API 606. Streaming manager API 606 may be provided as part of a full-featured integration platform, allowing an application connected to other applications through the integration platform to readily connect to streams through the use of a pre-defined repeatable stream object 608.

By way of non-limiting example, streaming manager API 606 may facilitate the creation and management of repeatable stream object 608 in order to facilitate data transformation for data stream 602, exchanging data between and within applications that use the integration platform across varying formats and transport protocols. As a result, an application that accesses streaming manager API 606 can define an appropriate repeatable stream object 608 that can connect to data stream 602 without the need to develop custom code to parse and otherwise read data from the data stream 602.

In accordance with an embodiment, streaming manager API 606 interfaces with a set of defined connectors in order to receive a stream from that connector's source. By way of non-limiting example, such connectors include a file connector, a file transfer protocol (FTP) connector, a database connector, a hypertext transfer protocol (HTTP) connector, and a sockets connector. One skilled in the relevant arts will appreciate that other types of connectors can be developed and provided, including specialized connectors for interfacing full-featured platforms, such as customer relationship management (CRM) platforms.

A connector, such as a file connector, reads from its source (in this case, a file) and provides a stream as an output. Repeatable stream object 608, instantiated from streaming manager API 606 to interface with the connector, receives that stream for processing as described above. The connector provides the stream using an agreed-upon stream convention that is known to streaming manager API 606 (e.g., through common definition of an "InputStream" data type).

Data accessed by a consumer 604 from data stream 602 over repeatable stream object 608 may be in any supported data stream form, as provided by an appropriate connector. A consumer 604 will receive individual chunks of data of data stream 602 through repeatable stream object 608, and can perform whatever appropriate processing is needed for that type of data.

Given this flexibility of data being sent through data stream 602 over repeatable stream object 608, it is possible to stream objects. When streaming objects, object data provided at a source is serialized by the corresponding connector for that source as data stream 602, and received through repeatable stream object 608 at consumer 604.

Repeatable streaming works with streaming objects, but some functionality works differently in this special case. In particular, memory handling is different in two ways. First, memory needs are defined in terms of a quantity of object instances that can be stored in a buffer, rather than in a raw data size. And second, a framework is provided for serializing the object instances for storage on disk if the object instances cannot fit in the in-memory buffer.

By way of non-limiting example, a repeatable stream object 608 allowing for file store of object instances may be defined with the following syntax:

```
<sfdc:query query="dsql:...">
    <ee:repeatable-file-store-iterable inMemoryObjects="100"/>
</sfdc:query>
```

In this non-limiting example, repeatable stream object 608 obtains a data stream 602 of object instances from a connector (in this case connected to a CRM), specified by some query (not shown). Repeatable stream object 608 in this case creates an in-memory buffer at memory 610 capable of storing 100 object instances. If the stream includes more than 100 object instances, repeatable stream object 608 will need to write objects to disk 612.

In accordance with an embodiment, repeatable stream object 608 serializes the object instances from the in-memory buffer at memory 610 for storage to disk 612. A process for serializing instances of the object can be invoked from an implementation within the object itself, in accordance with an embodiment. For example, standard Java serialization may be used, in which case the object will need to implement the Serializable interface, which will be called during the serialization process. In accordance with an additional embodiment, a software library implementing binary serialization is used to handle serialization of data within an object for writing to disk 612. However, one skilled in the relevant art will appreciate that serialization of objects is generally most successful when standard data types are used in a simple object, and more complex implementations may only be serialized by creating serialization routines accounting for the variety of data in the object.

Similar to the in-memory streaming discussed above, object instances from a data stream 602 can be committed solely to an in-memory buffer at memory 610. Again, such a buffer is defined in terms of quantities of object instances in the buffer. An exemplary syntax for defining a repeatable stream object 608 using only an in-memory buffer would be:

```
<sfdc:query query="dsql:...">
    <repeatable-in-memory-iterable
        initialBufferSize="100"
        bufferSizeIncrement="100"
        maxBufferSize="500" />
</sfdc:query>
```

In this example, the in-memory buffer at memory 610 is sized to hold 100 object instances. If more object instances are needed, the in-memory buffer grows in increments of 100 objects, up to a maximum buffer size of 500 object instances. If the size of data stream 602 exceeds 500 object instances, then the application fails as it has nowhere else to write the object instances (which must be preserved in order for the stream to remain repeatable).

Figure 8:
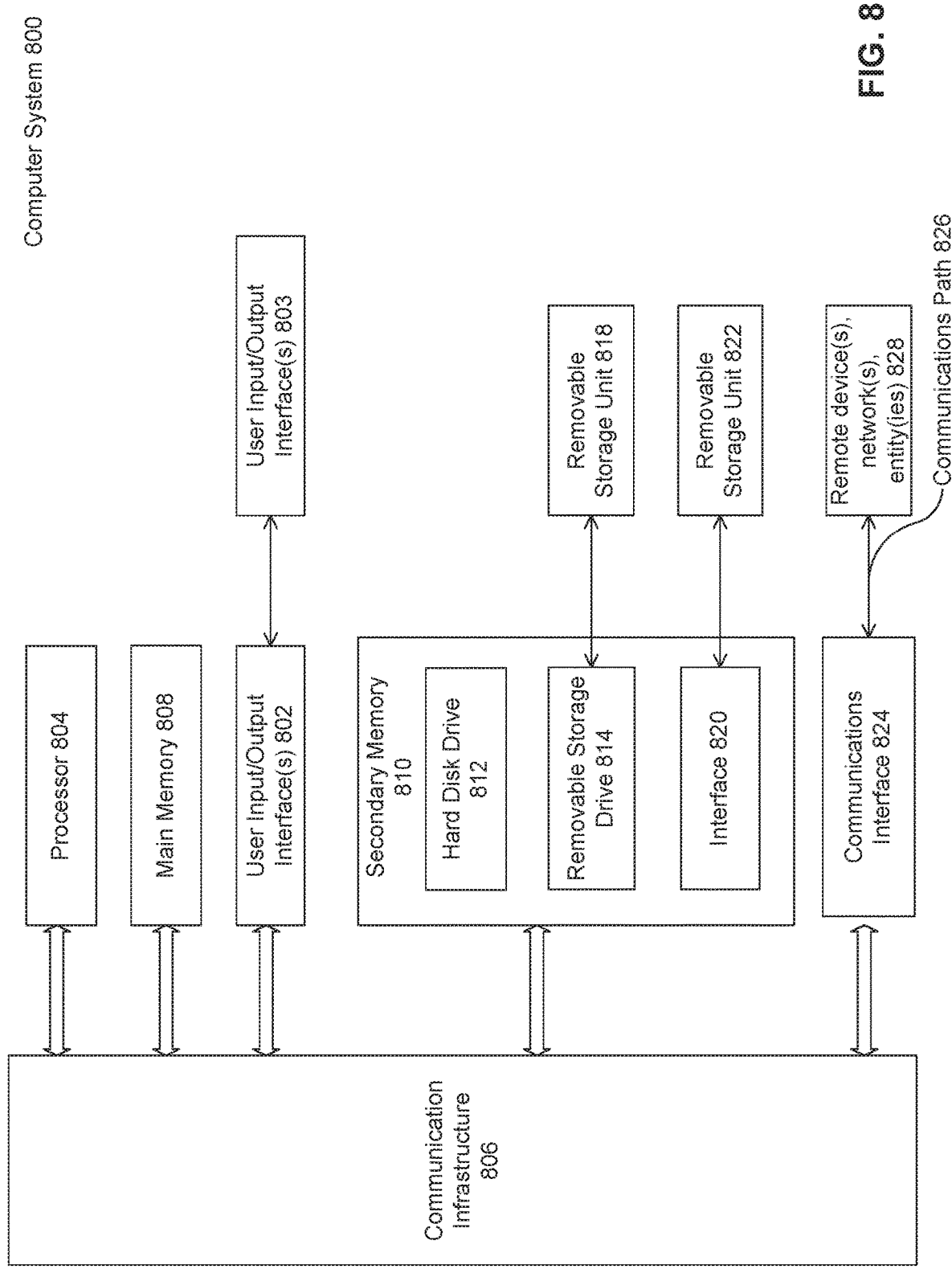
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include customer input/output device(s) 803, such as monitors, keyboards, pointing devices, etc., which may communicate with communication infrastructure 806 through customer input/output interface (s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   connecting, by one or more computing devices, a repeatable stream object to a data stream;
   writing, by the one or more computing devices, data from the data stream to an in-memory buffer of the repeatable stream object upon consumption of the data from the data stream by a first consumer connected to the repeatable stream object; and serving, by the one or more computing devices, the data in the in-memory buffer to a second consumer connected to the repeatable stream object, concurrent with writing the data from the data stream to the in-memory buffer, wherein the repeatable stream object is configured to permit the first consumer and the second consumer to independently access the data in the in-memory buffer concurrently and more than once.

2. The method of claim 1, wherein connecting the repeatable stream object to the data stream comprises:

instantiating a connector, wherein the connector is configured to access data for the data stream from a data source, and wherein the connector is configured to provide the data stream to the repeatable stream object.

3. The method of claim 1, further comprising:

instantiating the repeatable stream object from an application programming interface, wherein the repeatable object is instantiated in accordance with a data source of the data stream.

4. The method of claim 1, wherein writing the data from the data stream to the in-memory buffer of the repeatable stream object comprises writing additional data from the data stream beyond a capacity of the in-memory buffer to a disk, and wherein serving the data in the in-memory buffer to the first consumer and to the second consumer comprises serving the additional data in the disk to the first consumer and to the second consumer.

5. The method of claim 4, wherein the data from the data stream includes an object, and wherein writing the additional data from the data stream to the disk comprises serializing the object.

6. The method of claim 1, wherein serving the data in the in-memory buffer comprises:

tracking a first position in the data stream for the first consumer;

serving the data in the in-memory buffer to the first consumer corresponding to the first position in the data stream;

tracking a second position in the data stream for the second consumer; and serving the data in the in-memory buffer to the second consumer corresponding to the second position in the data stream.

7. The method of claim 1, further comprising:

configuring an initial size and a maximum size for the in-memory buffer.

8. A system, comprising:

a memory; and at least one processor coupled to the memory and configured to:

connect a repeatable stream object to a data stream, write data from the data stream to an in-memory buffer of the repeatable stream object upon consumption of the data from the data stream by a first consumer connected to the repeatable stream object, and serve the data in the in-memory buffer to a second consumer connected to the repeatable stream object, concurrent with writing the data from the data stream to the in-memory buffer, wherein the repeatable stream object is configured to permit the first consumer and the second consumer to independently access the data in the in-memory buffer concurrently and more than once.

9. The system of claim 8, wherein the processor configured to connect the repeatable stream object to the data stream is further configured to:

instantiate a connector, wherein the connector is configured to access data for the data stream from a data source, and wherein the connector is configured to provide the data stream to the repeatable stream object.

10. The system of claim 8, wherein the processor is further configured to:

instantiate the repeatable stream object from an application programming interface, wherein the repeatable object is instantiated in accordance with a data source of the data stream.

11. The system of claim 8, wherein writing the data from the data stream to the in-memory buffer of the repeatable stream object comprises writing additional data from the data stream beyond a capacity of the in-memory buffer to a disk, and wherein serving the data in the in-memory buffer to the first consumer and to the second consumer comprises serving the additional data in the disk to the first consumer and to the second consumer.

12. The system of claim 11, wherein the data from the data stream includes an object, and wherein writing the additional data from the data stream to the disk comprises serializing the object.

13. The system of claim 8, wherein the processor configured to serve the data in the in-memory buffer is further configured to:

track a first position in the data stream for the first consumer;

serve the data in the in-memory buffer to the first consumer corresponding to the first position in the data stream;

track a second position in the data stream for the second consumer; and serve the data in the in-memory buffer to the second consumer corresponding to the second position in the data stream.

14. A computer-readable storage device having instructions stored thereon that, when executed by one or more computing devices, cause the one or more computing devices to perform operations comprising:

connecting a repeatable stream object to a data stream;

writing data from the data stream to an in-memory buffer of the repeatable stream object upon consumption of the data from the data stream by a first consumer connected to the repeatable stream object; and serving the data in the in-memory buffer to a second consumer connected to the repeatable stream object, concurrent with writing the data from the data stream to the in-memory buffer, wherein the repeatable stream object is configured to permit the first consumer and the second consumer to independently access the data in the in-memory buffer concurrently and more than once.

15. The computer-readable storage device of claim 14, wherein connecting the repeatable stream object to the data stream comprises:

instantiating a connector, wherein the connector is configured to access data for the data stream from a data source, and wherein the connector is configured to provide the data stream to the repeatable stream object.

16. The computer-readable storage device of claim 14, further comprising:

instantiating the repeatable stream object from an application programming interface, wherein the repeatable object is instantiated in accordance with a data source of the data stream.

17. The computer-readable storage device of claim 14, wherein writing the data from the data stream to the in-memory buffer of the repeatable stream object comprises writing additional data from the data stream beyond a capacity of the in-memory buffer to a disk, and wherein serving the data in the in-memory buffer to the first consumer and to the second consumer comprises serving the additional data in the disk to the first consumer and to the second consumer.

18. The computer-readable storage device of claim 17, wherein the data from the data stream includes an object, and wherein writing the additional data from the data stream to the disk comprises serializing the object.

19. The computer-readable storage device of claim 14, wherein serving the data in the in-memory buffer comprises:
 tracking a first position in the data stream for the first consumer;
 serving the data in the in-memory buffer to the first consumer corresponding to the first position in the data stream;
 tracking a second position in the data stream for the second consumer; and
 serving the data in the in-memory buffer to the second consumer corresponding to the second position in the data stream.

20. The computer-readable storage device of claim 14, further comprising:
 configuring an initial size and a maximum size for the in-memory buffer.

* * * * *